Sept. 15, 1953
T. M. HUNT ET AL
2,652,281
SELF-RELEASING FISHING ROD TOOL
Filed Oct. 2, 1950
2 Sheets-Sheet 1
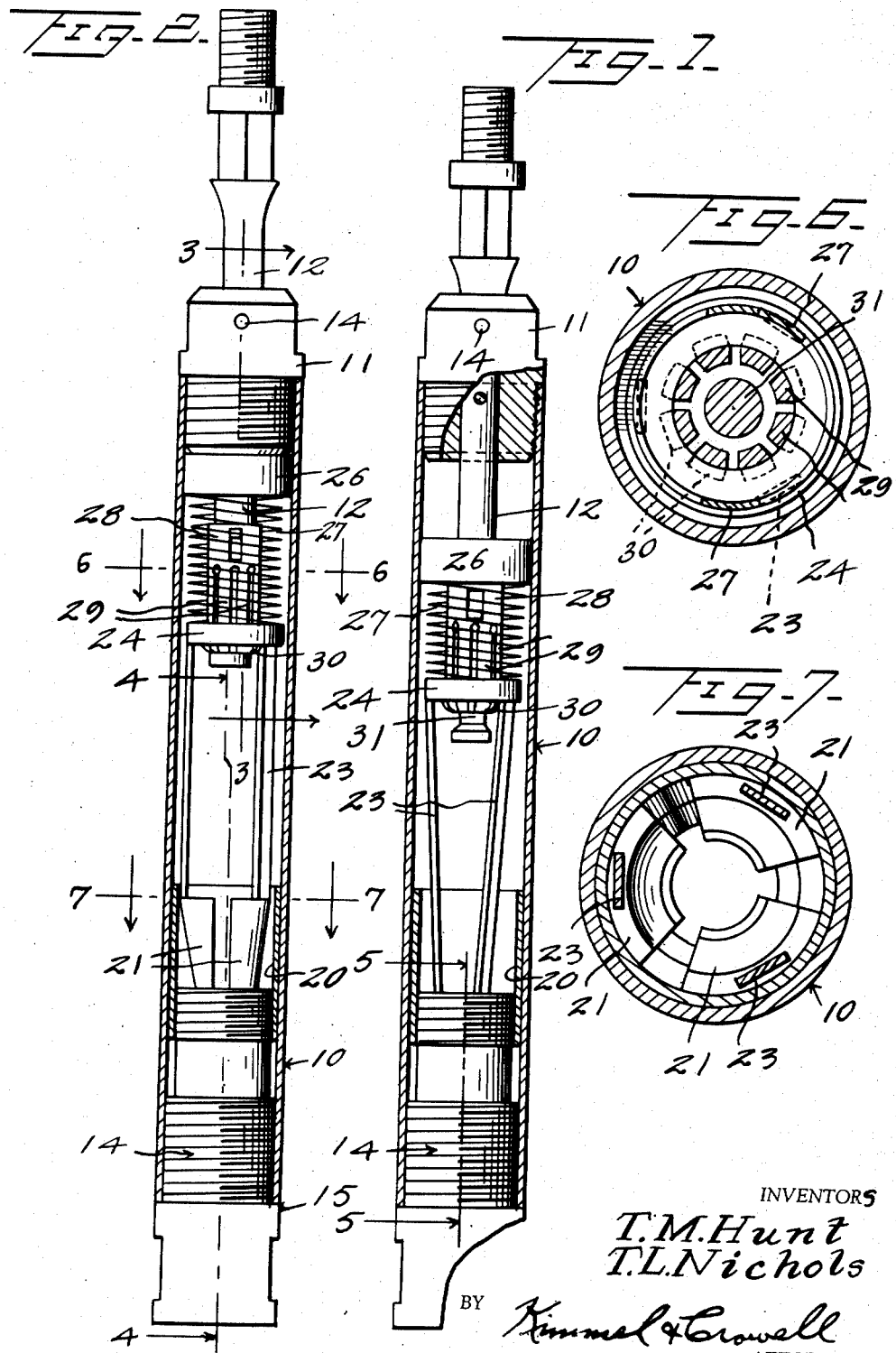
INVENTORS
T. M. Hunt
T. L. Nichols
BY Kimmel & Crowell
ATTORNEYS

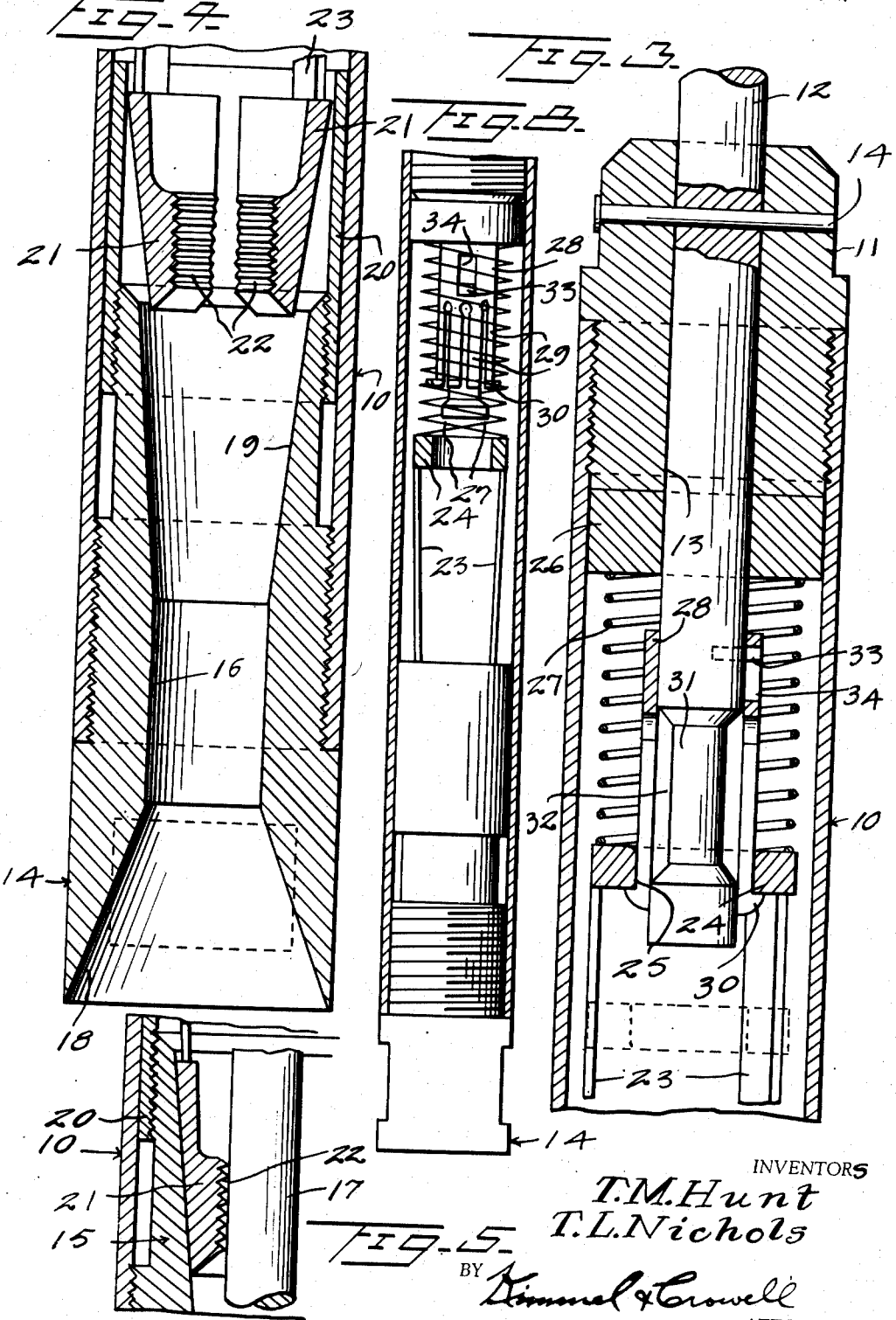

Patented Sept. 15, 1953

2,652,281

UNITED STATES PATENT OFFICE 2,652,281

SELF-RELEASING FISHING ROD TOOL

Theodore M. Hunt and Troy Lee Nichols, Tulsa, Okla.; said Hunt assignor to said Nichols Application October 2, 1950, Serial No. 187,982

1 Claim. (Cl. 294—102)

This invention relates to a fishing tool for drill rods.

An object of this invention is to provide a tool for pulling drill rods from wells which will automatically grip the drill rod, and in the event the drill rod is not caught onto an obstruction the drill rod may be readily pulled from the well.

The invention also includes means whereby the fishing tool may be automatically released from the drill rod if the latter is stuck in the well so that the fishing tool may be removed without the rod.

Another object of this invention is to provide a fishing tool embodying a rod and a casing secured to the lower end of the rod by means of a shear pin which is not under any strain when the rod is capable of being pulled.

With the above and other objects in view, my invention consists in the arrangement, combination and details of construction disclosed in the drawings and specification, and then more particularly pointed out in the appended claim.

In the drawings:

Figure 1 is a vertical section partly broken away and in detail of a fishing tool or a drill rod constructed according to an embodiment of this invention showing the tool in rod gripping position with the shear pin broken.

Figure 2 is a vertical sectional view showing the tool in rod releasing position.

Figure 3 is a fragmentary sectional view taken on the line 3—3 of Figure 2.

Figure 4 is a fragmentary sectional view taken on the line 4—4 of Figure 2.

Figure 5 is a fragmentary sectional view taken on the line 5—5 of Figure 1.

Figure 6 is a sectional view taken on the line 6—6 of Figure 2.

Figure 7 is a sectional view taken on the line 7—7 of Figure 2.

Figure 8 is a fragmentary vertical section showing the tool in rod gripping position.

Referring to the drawings, the numeral 10 designates generally an elongated tubular or cylindrical casing which has threaded into the upper end thereof a plug 11. The plug 11 is provided with a central bore 13 within which a shaft or rod 12 slidably engages. The shaft or rod 12 is held against endwise and rotary movement relative to the plug or body 11 by means of a transversely disposed shear or frangible pin 14.

The cylindrical member or casing 10 has threaded into the lower end thereof a jaw contracting member generally designated as 15. The jaw contracting member 15 as shown in Figure 4 is formed with a central bore 16 having a diameter sufficient to permit the upper end of the drill rod 17 to loosely pass therethrough. The lower end of the bore 16 terminates in a flared or conical guide passage 18, and the bore 16 merges at its upper end into a tapering jaw contracting passage 19.

A cylindrical sleeve 20 is threaded onto the upper end of the jaw contracting member 15 and engages within the casing or cylindrical member 10. A plurality of tapered jaw members 21 are disposed within the casing 10 and are formed with toothed or serrated inner faces 22. Each jaw 21 is fixed to an elongated resilient bar 23 which extends upwardly from the jaw contracting member 15, and each resilient bar 23 is secured at its upper end to a collar 24 having a central opening 25.

The shaft 12 has fixed thereto as by welding or other suitable securing means a collar 26 which when the pin 14 is unbroken abuts against the lower end of the plug 11. A spring 27 is disposed about the shaft 12 between the collar 26 and the collar 24 so as to constantly urge collar 24 downwardly and retain the rod gripping or clamping members 21 within the tapered jaw contracting bore 19.

In the event the drill rod 17 does not stick within the well or well casing the gripping members 22 will be disposed within the upper end of the jaw contracting member 15, and the collar 24 will be disposed in downwardly spaced relation with respect to the lower end of shaft 12 as shown in Figure 8. In the event, however, that the drill rod 17 is firmly stuck within the well or well casing so that it cannot be readily pulled therefrom after being gripped by the gripping or clamping members 21, the latter can be automatically released from the drill rod 17 as will be hereinafter described. A collar clamping sleeve 28 is loosely mounted on the lower portion of shaft 12 below the collar 26 and is provided with a plurality of lengthwise extending resilient fingers 29 having laterally projecting jaws 30 at their lower ends.

The shaft 12 is formed adjacent the lower end thereof with a reduced diameter stud 31 forming a space 32 slightly above the lower end of shaft 12 so that when the collar clamping members 30 are positioned downwardly in the bore of collar 24 the fingers 29 may flex into the annular space 32. The collar clamping sleeve 28 is held against removal from the shaft 12 by means of a pin 33 carried by the shaft 12 which slidably engages a lengthwise extending slot 34 formed in the sleeve 28.

In the use and operation of this device the fishing tool is initially disposed with the parts arranged as shown in Figure 8. At this time the collar 24 which is fixed to the upper ends of the spring bars 23 is below the collar clamping sleeve 28 and the lower end of shaft 12. Pin 14 at this time will hold shaft 12 against rotary and endwise movement relative to the plug 11. The tool is lowered over the drill rod 17 which will move the jaws 21 upwardly a short distance until the jaws are able to engage beneath the collar at the upper end portion of the drill rod. When the jaws 21 pass the drill rod collar the jaws will be moved downwardly by the spring 27.

If the drill rod 17 is not stuck within the well or casing the fishing tool will readily remove the drill rod from the well or well casing. In the event, however, the drill rod is stuck sufficiently tight that it cannot be pulled, the fishing tool is released from the rod by striking the upper end of the rod connected with a shaft 12. This impact will cause pin 14 to become sheared, and shaft 12 may then be moved downwardly to the position shown in Figure 1. At this time the collar clamping sleeve 28 will have the jaws 30 thereof engaged below the collar 24 so that collar 24 with jaw carrying bars 23 will be gripped to shaft 12. The rod connected with shaft 12 is given further jarring so that casing 10 may slide downwardly until the lower end of plug 11 engages the upper side of collar 26 which is fixed to shaft 12. Jaws 21 which are biased outwardly to released position by the resilient bars 23 will then move outwardly to disengaged position with respect to the drill rod 17. The fishing tool being now released from the drill rod may be removed by upward movement.

This tool will provide an effective means in the form of a fishing tool whereby broken drill rods can be pulled from the well or well casing in the event the rods are not too tightly stuck within the well or well casing. In the event the drill rod cannot be readily removed from the well or well casing by the fishing tool hereinbefore described, the tool may be released from the drill rod as hereinbefore described.

What is claimed is:

A drill rod fishing tool comprising a tubular casing, a tapered jaw contracting member carried by the lower end of said casing, a plug in the upper end of said casing having a central bore, a plurality of tapered drill rod clamping jaws in said casing, spring means constantly urging said jaws downwardly to clamping position, a shaft having a reduced portion slidable through said bore, a collar fixed to said shaft below said plug, frangible means carried by said plug and extending transversely through said shaft normally holding said collar against the lower end of said plug, a ring above said jaws, resilient bars fixed between said ring and said jaws biasing said jaws to released position, a sleeve having a limited slidable connection to said shaft above said reduced portion, inwardly biased resilient clamping fingers having outwardly turned lugs engaging under said ring carried by said sleeve, downward movement of said shaft on breaking of said frangible means juxtaposing said clamping fingers to said reduced portion of said shaft to release the engagement of said lugs from said ring to release said ring for downward movement relative to said shaft, whereby said jaws drop downwardly and said contracting member effects clamping of said jaws on said rod.

THEODORE M. HUNT.
TROY LEE NICHOLS.

References Cited in the file of this patent
UNITED STATES PATENTS

| Number | Name | Date |
|---|---|---|
| 1,898,261 | Otis | Feb. 21, 1933 |
| 2,128,102 | Sherman | Aug. 23, 1938 |
| 2,252,767 | Hudson | Aug. 19, 1941 |
| 2,508,285 | Otis et al. | May 16, 1950 |